United States Patent [19]

Tisdale, III et al.

[11] 4,274,799

[45] Jun. 23, 1981

[54] METHOD AND APPARATUS FOR REELING PIPELINE

[75] Inventors: Benjamin C. Tisdale, III, River Ride, La.; William B. Nicholson, Corpus Christi, Tex.

[73] Assignee: Martech International, Inc., Houston, Tex.

[21] Appl. No.: 878,302

[22] Filed: Feb. 16, 1978

[51] Int. Cl.³ .............................................. F16L 1/04
[52] U.S. Cl. ...................................... 414/747; 16/19; 16/32; 242/86.5 R; 242/86.51; 254/134.3 SC; 405/158; 414/786
[58] Field of Search ................... 214/152, 1 P, 1 PA, 214/14; 242/86.2, 86.5 R, 86.51; 405/154, 158, 168; 254/134.3 SC; 414/139, 745, 747, 786, 128; 16/33, 19, 32, 34; 137/355.17, 355.23; 248/129

[56] References Cited

U.S. PATENT DOCUMENTS

| | | | |
|---|---|---|---|
| 3,140,063 | 7/1964 | Bucklen | 242/86.51 X |
| 3,251,332 | 5/1966 | Vassar | 214/14 X |
| 3,670,988 | 6/1972 | Leonard | 114/254 X |
| 3,872,680 | 3/1975 | Nicholson | 405/168 |
| 4,066,093 | 1/1978 | Egerstrom | 242/86.2 X |
| 4,108,455 | 8/1978 | James | 16/33 |

*Primary Examiner*—Leslie J. Paperner
*Attorney, Agent, or Firm*—Bernard A. Reiter

[57] ABSTRACT

A method and apparatus for loading pipeline from the shore onto a reel mounted on a vessel adjacent to the shore whereby the reel may be pivoted from its normal operational position in which the reel axis is perpendicular to the longitudinal axis of the vessel to a position in which the reel axis is parallel to the longitudinal axis of the vessel so as to thereby permit the vessel to be anchored parallel to the shore while the pipe-loading operation is being conducted.

7 Claims, 8 Drawing Figures

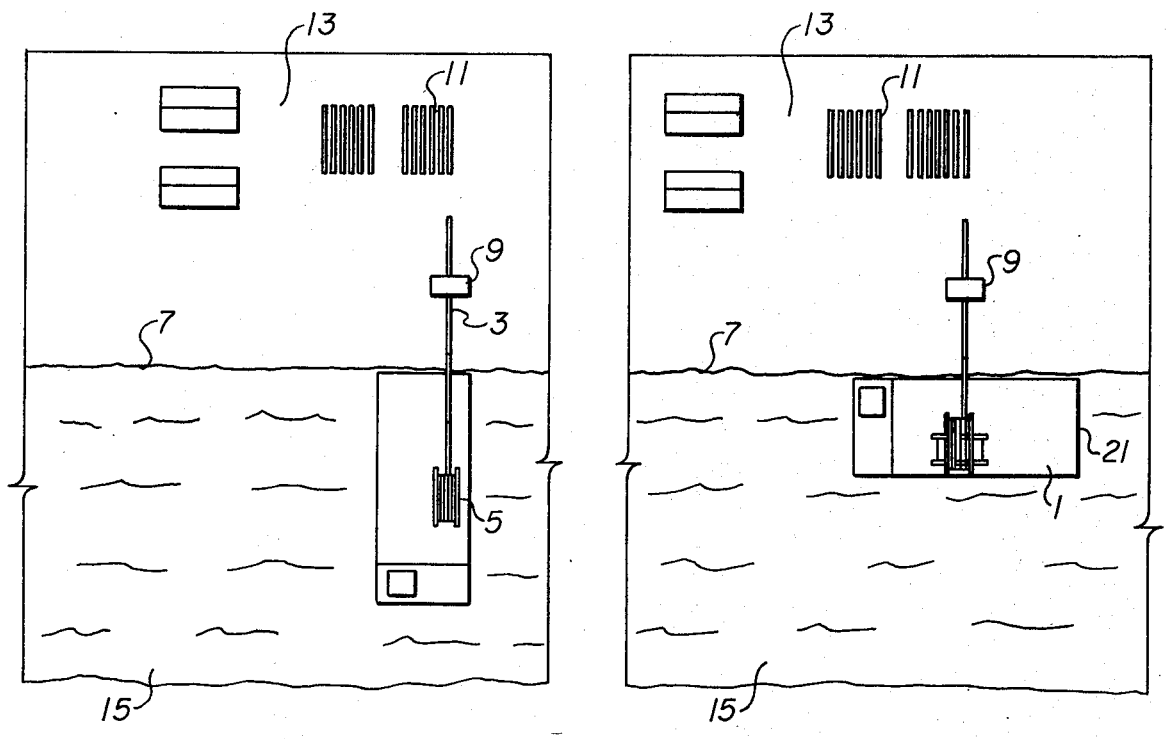
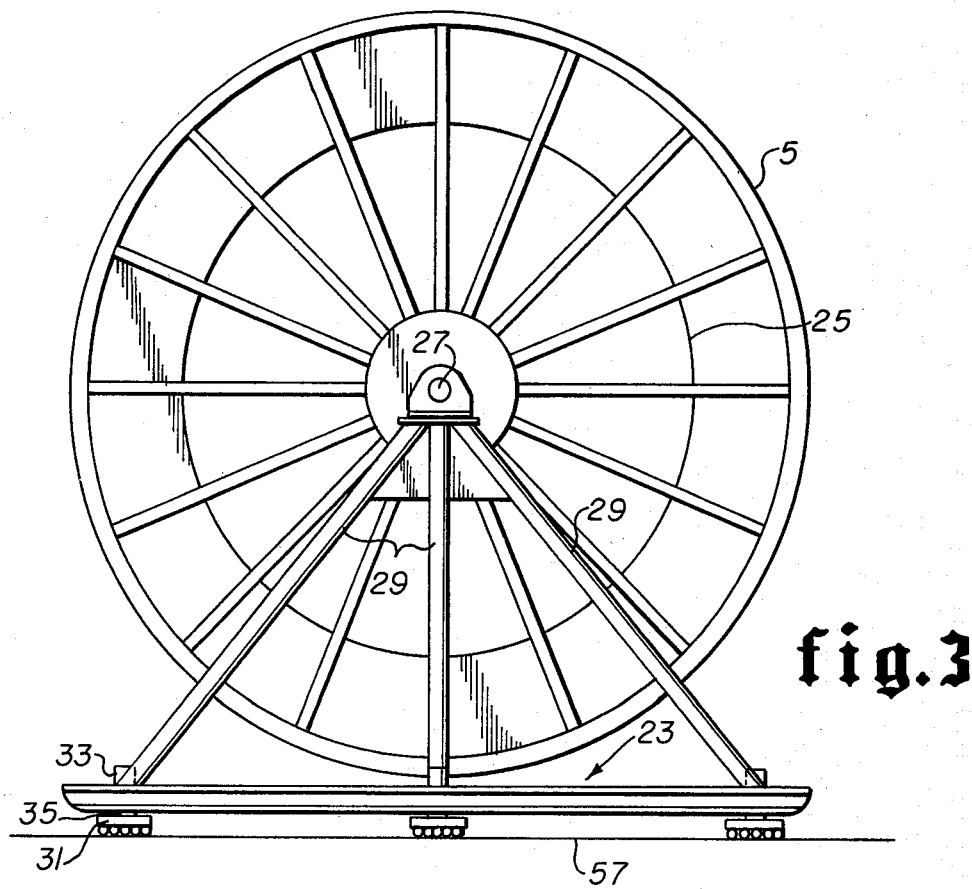

METHOD AND APPARATUS FOR REELING PIPELINE

BACKGROUND OF THE INVENTION

The laying of pipeline on the floor of a body of water is commonly accomplished by unreeling the pipeline from a barge-type vessel on which there is mounted a reel having the pipe wound thereon. As the vessel moves forward, the reel rotates, thus allowing the pipeline to unwind therefrom and to be played over the stern of the vessel and into the water so that the vessel, therefore, moves continuously away from the pipeline as it is laid on the water floor. Efficient deployment of the pipeline thus requires that the pipeline reel rotate about an axis perpendicular to the longitudinal axis of the vessel.

Prior to deployment or unloading of the pipeline from the vessel into the body of water, it is necessary of course to wind the pipeline onto the reel. This is accomplished on shore at an appropriate pipe-fabricating facility where joints of pipe are welded together and then loaded onto the reel. In order to load the pipe onto the reel, however, it has generally been necessary to dispose the vessel with its longitudinal axis perpendicular to the shoreline since the pipeline, which is relatively rigid, must be wound about a reel, the axis of which is perpendicular to the longitudinal axis of the vessel, since it is from this position which the pipe will eventually be deployed over the stern and into the water, as explained above. Pipe-fabricating facilities, however, are frequently located on inland waterways, and positioning of the vessel in the manner described causes the vessel to pose an obstruction to passing traffic in the waterway. It, therefore, becomes necessary either to interrupt the loading process and move the vessel to allow another to pass, or the vessel must be positioned initially adjacent and parallel to the shoreline and the pipeline loaded thereafter by bending the pipeline through an arc as it is loaded onto the reel. This latter procedure is undesirable because it imparts stresses to the pipeline and causes and other operational complexities.

BRIEF SUMMARY OF THE INVENTION

The present invention discloses a method and apparatus for reeling pipeline from the shore onto a reel mounted on a vessel. The vessel is anchored parallel to the shore so as to avoid posing an obstacle to passing traffic on inland waterways. Further, bending of the pipeline through an arc from the shore onto the reel is avoided. This is accomplished by mounting the reel for pivotal movement on a structural cradle, the cradle being mounted on a plurality of trucks adapted to move in a sufficient arc to align the spool surface of the reel with the longitudinal axis of the pipe on shore. After the pipe is loaded onto the reel, the truck-mounted cradle carrying the reel is caused to rotate until the reel is disposed with its axis perpendicular to the longitudinal axis of the vessel and so that the pipeline may later be deployed over the stern thereof. When the proper positioning is accomplished, a hydraulic circuit is actuated which causes the trucks to withdraw into the cradle, thereby lowering the cradle and the reel carried thereon onto the deck of the vessel where it is thereafter locked in fixed position. There is thus provided a pivotally mounted reel apparatus for a pipe-laying barge which enables loading of the pipeline onto the reel of the barge without bending of the pipeline in its horizontal plane.

Another feature and advantage of the invention is the provision for a barge and reel apparatus which may load pipe in such a manner as to avoid posing an obstacle to other inland waterway traffic.

Another feature and advantage of the invention is the provision for a truck-mounted cradle carrying a reel on a vessel for moving the reel in pivotal manner about an axis.

Still another feature and advantage of the invention is the provision for a pivotally mounted pipeline reel on a vessel wherein the reel is supported in its operational position on the deck of the vessel itself and which may be rotated to its loading position by hydraulically lifting the reel on a plurality of trucks which thereafter move it to appropriate position.

Yet another feature and advantage of the invention is the provision for a pivotally mounted pipeline reel mounted on a vessel and in which the reel is adapted to move in a pivot slot toward the center of the vessel in order to ensure against collision of the reel with objects adjacent to the vessel.

Yet another feature and advantage of the invention resides in a new and improved method for loading pipeline onto a reel mounted on a vessel.

Still another feature and advantage of the invention resides in an improved method and apparatus for lifting a loaded or an unloaded pipeline reel from the deck of a vessel and pivotally moving the reel from one position to another.

The above, and numerous other features and advantages of the invention will become apparent upon a careful reading of the following detailed description, claims and drawings wherein like numerals denote like parts in the several views and wherein:

DESCRIPTION OF THE DRAWINGS

FIG. 1 is a schematic view in plan of the prior art reel-loading arrangement.

FIG. 2 is a plan view of the proposed arrangement for loading pipe on a reel in accordance with the invention.

FIG. 3 is a side elevation view of a mobile-mounted reel such as proposed for use in FIG. 2.

DETAILED DESCRIPTION

Figure 4:
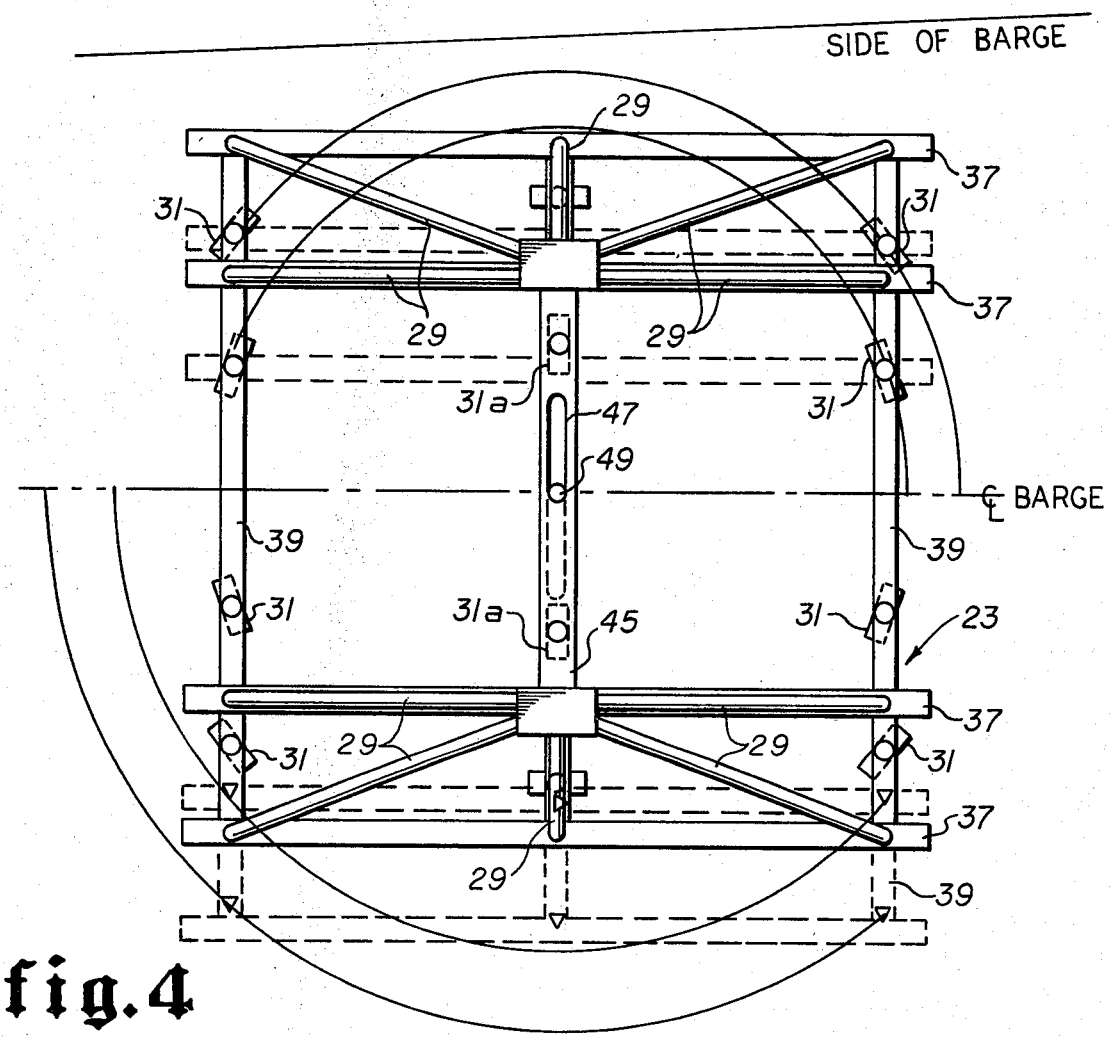
FIG. 4 is a top view of the reel showing the positioning thereof when in its operational position on the vessel.

With reference now to FIG. 1, there is shown in planar view a prior-art arrangement in which the barge 1 may be disposed in a first position or as in FIG. 2 in a second position in order to receive the pipe 3 on the reel 5, the latter being fixedly mounted on the barge for rotation about the reel axis. The barge or vessel, as disposed in position B, is perpendicular to the shoreline 7 in order that the pipeline may be wound onto the reel apparatus 5 directly linearly as it emanates from the welding apparatus 9 where the individual joints 11 are connected together. The joints 11 are stored in the pipe-assembly areas 13 where they are generally processed and thereafter welded to one another prior to loading onto the reel. It is readily apparent that the vessel 5 protrudes into the inland waterway 15 so as to pose an obstacle to, if not preclude, the passage of other vessels. In the alternative the vessel 1 may be disposed to reside at position where, although there is no obstacle to the passage of other vessels in the waterway 15, it becomes obvious that loading of the pipe requires the bending thereof through an arc in order to move the pipe from the assembly area onto the reel. This arrangement introduces stresses to the pipe along with the possible need to reverse bend the pipe after it has passed through the arc, but before it has been loaded onto the reel. These possible additional steps introduce additional necessary time for loading the pipe, thereby reducing the efficiency of the entire operation and escalating the cost. Thus, neither of the prior-art arrangements provide a satisfactory method for removing the pipe from the assembly area onto the reel of the vessel.

With respect to FIG. 2, there is shown the proposed positioning of the vessel and the arrangement of the reel thereon. Here the reel is maintained in direct aligned position with the assembly area during the loading procedure by means of a mobile cradle (described hereinafter). The cradle is supported on a plurality of hydraulically actuated trucks (described hereinafter also) which enable rotational movement of the reel about a vertical axis. Actuation of the cradle readily turns the reel to the position indicated in FIG. 2 for loading of the pipeline thereon. When the loading procedure is completed, the cradle is again actuated in order to rotate the reel to its second position (see dotted line) from which the loaded pipeline may be deployed over the stern 21 of the vessel while it moves forward.

In FIG. 3 there is shown a side elevation of the reel apparatus 5 as it is supported on the mobile cradle 23. The reel apparatus itself comprises a spool 25 upon which the first lap of wound pipe resides. Subsequent laps rest upon each prior lap of pipe. The spool and entire reel apparatus is adapted to rotate about an axle 27. The axle is supported on foundation blocks 29 which in turn are supported and braced by a plurality of struts extending from the mobile cradle 23. Mounted within the cradle and extending from the bottom thereof are a plurality of trucks 31, each of which comprise a hydraulic cylinder 33 and piston 35, the latter of which is adapted to move into and out of the former, thus raising and/and lowering the vertical distance of the mobile cradle 23 from the vessel deck 57.

Figure 5:
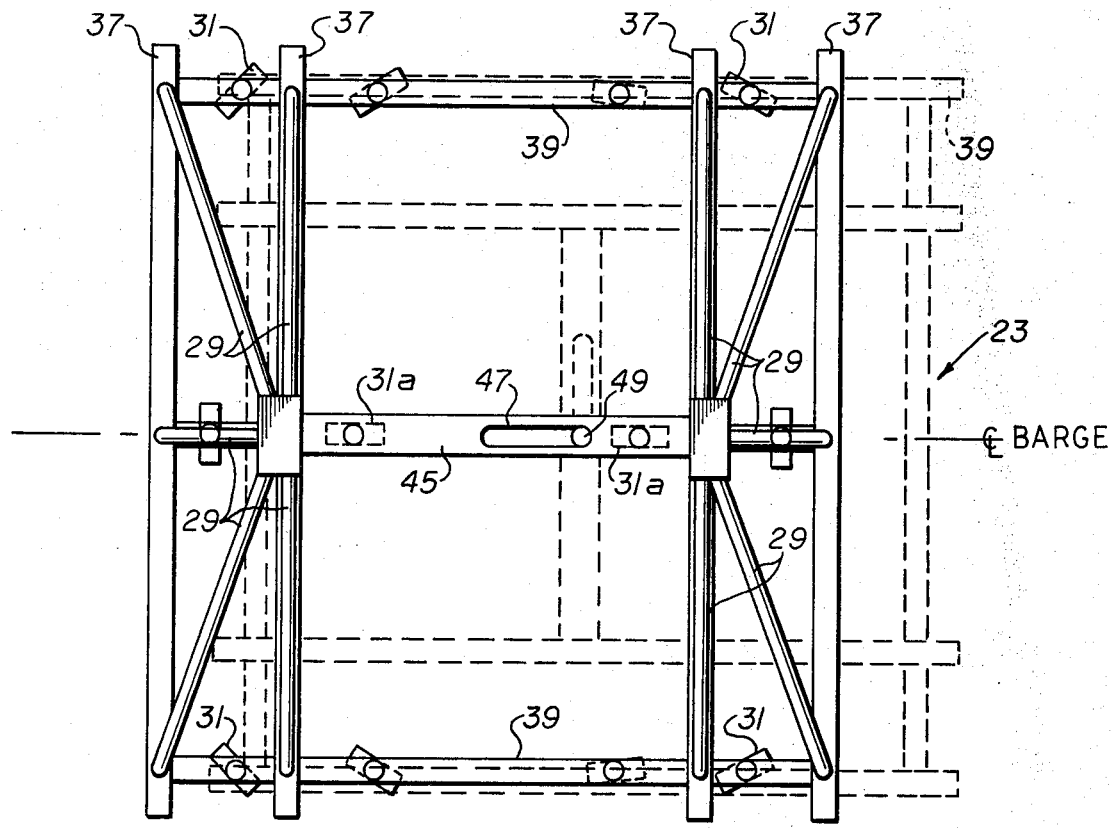
FIG. 5 is a top view of the reel showing the positioning thereof when in its loading position on the vessel.

The mobile cradle 23 may comprise a plurality of longitudinal and lateral beams 37, 39 respectively, fixedly connected to one another such as by welding, so as to thereby form a rigid base and supporting foundation for not only the reel, but also the pipeline to be wound thereon, see FIGS. 4 and 5. The cradle 23 is further characterized by a central prime beam 45 disposed generally in the plane of beams 37 and 39, but having therein a pivot slot 47. Fixedly connected to the deck structure of the vessel and extending vertically therefrom is a pivot post 49 adapted to reside within the pivot slot 47, and thus allow for movement of the cradle and, hence, the reel to the extent of the dimensional limits of the length of the slot. It will, thus, be recognized further that the pivot slot 47 and pivot post 49 enable the cradle to move a radial distance the length of the slot in substantially any direction. By this construction there is provided a means for moving the reel toward the center line of the barge and away from the side of the barge so as to prevent the reel or supporting structure therefor from rotating over the side of the barge and coming in contact with an adjacent vessel or other structure. At the same time, there is provided a rigid structural member (pivot post 49) integrally affixed to the vessel itself for preventing undesired excess movement beyond that which may be imparted to the reel cradle by the trucks 31.

In FIG. 5 there is shown the relative position of mobile cradle 23 when it is adapted for receiving pipeline on the reel with the vessel in parallel relation to the shoreline. Here it is seen that primary beam 45 has been rotated to a position parallel to the center line of the barge where, by comparison to that shown in FIG. 4, the primary beam 45 is perpendicular to the center line of the barge, the latter, therefore, representing the operating position of the reel (that is for laying pipe) and the former representing the position of the reel when pipe is being loaded thereon. Here it may be noted that the mobile cradle has been moved closer toward the center line of the barge and thereafter rotated 90 degrees, or as necessary, so as to receive pipeline onto the reel. Relative positioning of the mobile cradle to the center line of the barge is most evident by reference to the position of the pivot slot 47 and the pivot post 49 therein, where, as shown in solid line, it is seen that the pivot slot has been moved toward the center line and then rotated clockwise to the position shown in solid line. (See FIG. 4 versus FIG. 5.)

Figure 6:
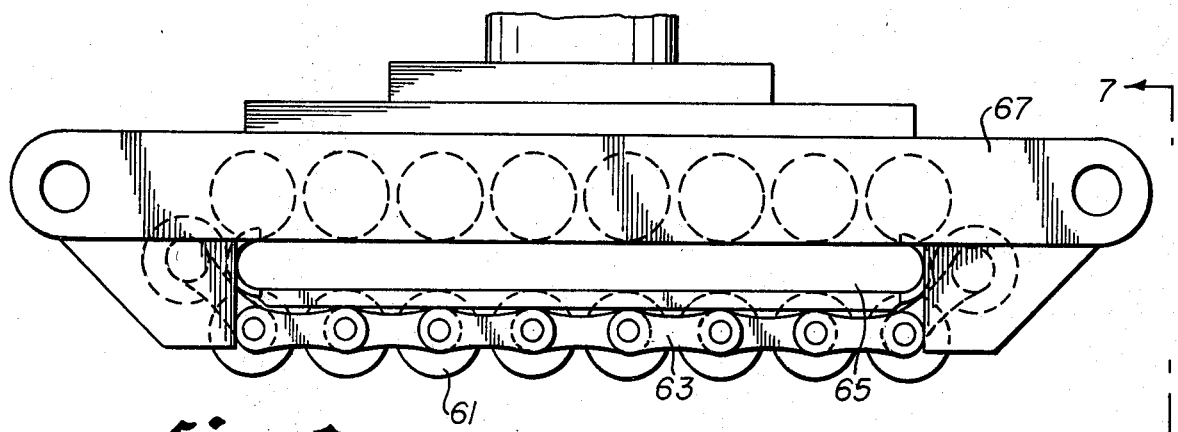
FIG. 6 is an elevation view of one of the trucks used to support and move the reel to and from its operational position.
Figure 7:
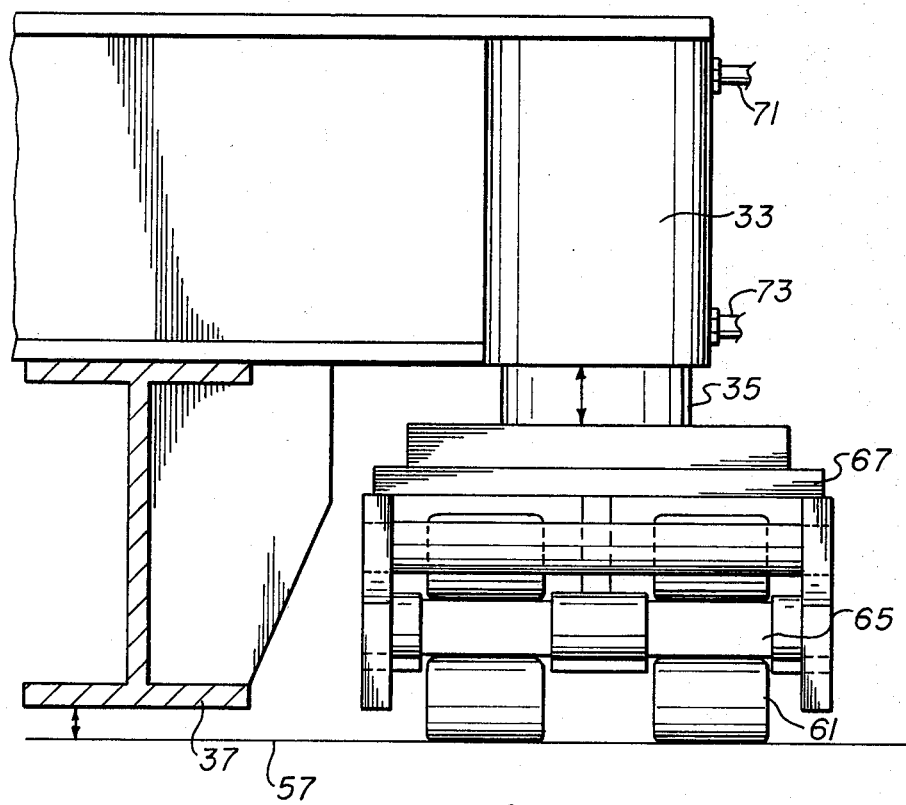
FIG. 7 is a front view of the truck of FIG. 6 in accordance with the plane 7—7 thereof.

The mobile cradle includes, as explained above, a plurality of longitudinal beams 37. When the reel apparatus is in its operating configuration, that is for carrying and/or unreeling pipeline, (see FIG. 4), the longitudinal beams 37 physically rest upon and are supported by the deck 57 of the vessel. However, in order to move the reel, it is necessary to raise the mobile cradle 23, this being accomplished by the truck means 31. With reference now to FIGS. 6 and 7, there is shown an exemplary form of the truck means 31. The truck means may consist of a plurality of track-type wheels 61 affixed to one another by cooperating hinge linkages 63, each of the wheels moving about the common track 65. The plurality of wheels is contained within and supported by a housing 67 that is fixedly connected to and extends from piston 35 adapted to move within cylinder 33 by reason of hydraulic pressure alternatively introduced or bled from hydraulic lines 71, 73 which communicate with the cylinder. Thus, in order to lift the mobile cradle in anticipation of rotating same, so as to place the reel in the loading position illustrated by FIG. 5, pressure would be introduced into cylinder 33 so as to project the piston 35 therefrom and move the truck wheels 61 in contact with the deck of the vessel, thus lifting the longitudinal beam 37 of the cradle from the deck. Thereafter, motive power is applied to the wheels 61 so as to cause appropriate rotational movement of the cradle. As shown in FIGS. 4 and 5, the trucks 31 are selectively located on the mobile cradle in order to appropriately support the reel and distribute the weight thereof.

Figure 8:
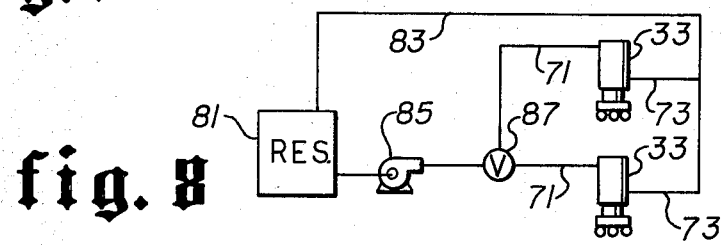
FIG. 8 is a schematic illustration of the hydraulic circuit for controlling movement of the reel.

The hydraulic reservoir communicating with hydraulic lines 71, 73 of cylinder 33 in FIG. 7 is likewise connected to the cylinder of each of the trucks. Thus, for illustrative purpose there is shown in FIG. 8 the schematic arrangement whereby reservoir 81 is connected by appropriate conduit with pump 85 and through actuation of valve 87 pressure is introduced through the line 71, 71 to the cylinders 33. Bleeding of the pressure from cylinders 33 in order to lower the reel onto the deck so that longitudinal beams 37 rest thereon is accomplished by actuation of bleed lines 73 which thereafter communicate with the return line 83 to the reservoir.

In operation the vessel or barge 1 is moved into parallel relation to the shoreline 7 as shown in FIG. 2, so that waterway 15 remains unobstructed for passage of other vessels. Pump 85 is actuated and valve 87 opened so as to allow fluid pressure from reservoir 81 to flow into cylinders 33 which characterize each of the trucks 31. After the trucks have elevated the mobile cradle 23 (see FIG. 5) the reel apparatus 5 is moved from its typically off-center position with respect to the center line of the barge toward the center line of the barge by sliding the pivot slot 47, having pivot post 49 therein, toward the center line of the barge. This permits rotation of the reel on the deck of the barge without the structure of the reel or the superstructure supporting it, extending over the side of the barge (see FIG. 4) and thus ensures against unintended contact with or damage to adjacent vessels or objects. Clearly, the step of moving the reel laterally of the longitudinal center line of the barge would become unnecessary if the reel could be rotated without any structure moving over the side of the barge and into contact with the aforesaid adjacent structures. Thereafter, motive power is supplied to the truck means in order to initiate rotational movement of the mobile cradle to a position wherein the cradle spool 25 is substantially perpendicular to the axis of the pipeline being loaded thereon, see FIG. 4. After the pipeline is loaded thereon, the motive power for the truck is again actuated so as to move the mobile cradle back to the operational position for the reel, see FIG. 4. Pressure is then bled from the hydraulic cylinders 33 so that the weight of the reel itself will cause the longitudinal beams 37 to be lowered to the deck 57 of the vessel. It will be recognized that after the pipe has been loaded, but before the cylinders 33 are bled, it may be necessary to move the cradle away from the center line of the barge, that is along the longitudinal axis of the pivot slot 47 if the cradle had been moved toward the center line of the barge initially. This, as previously explained, is accomplished by lateral movement of the cradle on trucks 31. For the purpose of moving the cradle 23 laterally of the barge center line, prior to loading of pipe, or subsequent to loading of pipe, there is provided two or more supplemental trucks 31a structurally affixed to and extending from the primary beam 45. The supplemental trucks 31a are identical to trucks 31 except that the piston 35 and cylinder 33 are operable independently of the remaining pistons and cylinders, so that substantially the entire weight of the cradle and reel may be supported thereon, thereby facilitating lateral, rather than rotational, movement of the cradle with respect to the center line of the barge.

It will be recognized that the various features and structural arrangements shown herein are illustrated for exemplary purposes, and that the concept herein may be practiced with other structures and arrangements without departing from the spirit of the invention. For example, numerous forms of truck means may be employed, not the least of which may be various wheeled devices, air-bearing arrangements, skids and/or tooth-and-ratchet-type jacks, all for rotationally moving the mobile cradle with respect to the deck. Likewise, it will be recognized that numerous arrangements may be employed for lifting the reel and mobile cradle other than the hydraulic piston-and-cylinder arrangement shown. Various jack-up-and-elevator arrangements are conventional in this respect. Therefore, the invention herein should not be limited in its interpretation to the specific embodiment and illustrations shown, but should instead be governed by and interpretated in accordance with the claims appended hereto, read in the light of the disclosure herein contained.

Therefore, that which is desired to be secured by United States Letters Patent is:

What is claimed is:

1. In combination with a vessel having a reel supported thereon for laying pipeline unwinding from the reel onto the floor of a body of water as the vessel passes thereover, the axle of the reel being disposed normal to the longitudinal axle of the vessel when in the pipelaying position, the improvement including means for pivotally moving the reel about an axis extending vertically through the axle so that the reel axle is in a loading position which is different from the pipelaying position, when pipeline is being loaded onto the reel,
   said means for pivotally moving the reel including a central axis about which pivotal movement takes place, and
   means for moving the central axis laterally of the vessel axis so as to translate the reel away from the side of the vessel prior to pivotal movement thereof.

2. The combination in claim 1 wherein the said pivotal means includes a cradle adapted to rest on the deck of the vessel when the reel is in its first position and includes lifting means for raising the cradle from the deck, and truck means for thereafter translating the cradle means to its second position.

3. The combination of claim 2 wherein said lifting means is structurally coupled between said cradle means and truck means.

4. The combination of claim 3 wherein said lifting means comprises a piston and cylinder in which actuation thereof produces telescopic expansion or contraction so as to move the truck means from the cradle into supporting engagement with the vessel, thereby lifting the cradle off the deck of the vessel.

5. In an apparatus for pivotally moving a pipeline reel from an operating position on water-borne vessel wherein pipeline is played out therefrom onto the floor of a body of water to a loading position wherein the reel is disposed in an angular position different from the operating position, comprising:
   a reel mounted on an axle,
   structural means supporting the axle at each end thereof,
   a cradle means supporting the structural means normally resting on the deck of the vessel,
   truck means operable to lift the cradle means off the deck of the vessel, and
   power means for actuating the truck means to pivot the cradle means from the said operating position to said loading position,
   said cradle means being characterized by a pivot means operatively associated with the vessel and about which the cradle moves, so as to produce predetermined reliable movement of the reel when it is lifted from the vessel deck,
   said pivot means including an elongate slot means for operatively moving the cradle means laterally of the longitudinal axis of the vessel so as to pivot the reel preparatory to loading about an axis more proximate said vessel axis than the reel normally resides during pipelaying therefrom, thereby avoiding inadvertent collision of the reel with objects adjacent the vessel.

6. The method of loading a pipeline onto a reel supported on a vessel which traverses a body of water while the pipeline is played therefrom in a direction opposite to the path of travel and onto the floor beneath the body of water comprising the steps of:

docking the vessel in proximate relation to a pipeline supply to be loaded onto a reel on the vessel, pivoting the reel so as to align it such that the pipeline is loaded thereon from a direction substantially perpendicular to the axis of the reel, loading the pipeline onto the reel, pivoting the reel back to its operating position for playing the pipeline into the water in a direction opposite to the path of travel of the vessel, mobilizing the reel for movement prior to actuating the pivoting mechanism thereof in anticipation of loading, translating the reel toward the center line of the vessel prior to pivoting of the reel so that the structure thereof does not collide with objects adjacent the vessel as it pivots in an arc of a circle.

7. The method of loading a pipeline onto a reel supported on a vessel which traverses a body of water while the pipeline is played therefrom in a direction opposite to the path of travel and onto the floor beneath the body of water comprising the steps of:

docking the vessel in proximate relation to a pipeline supply to be loaded onto a reel on the vessel, pivoting the reel so as to align it such that the pipeline is loaded thereon from a direction substantially perpendicular to the axis of the reel, loading the pipeline onto the reel, pivoting the reel back to its operating position for playing the pipeline into the water in a direction opposite to the path of travel of the vessel, mobilizing the reel for movement prior to actuating the pivoting mechanism thereof in anticipation of loading, and translating the reel toward the center line of the vessel prior to pivoting of the reel so that the structure thereof does not collide with objects adjacent the vessel as it pivots in an arc of a circle.

* * * * *